G. Crompton,
Loom.
No. 94,873.
2 Sheets, Sheet 2.
Patented Sep. 14, 1869.
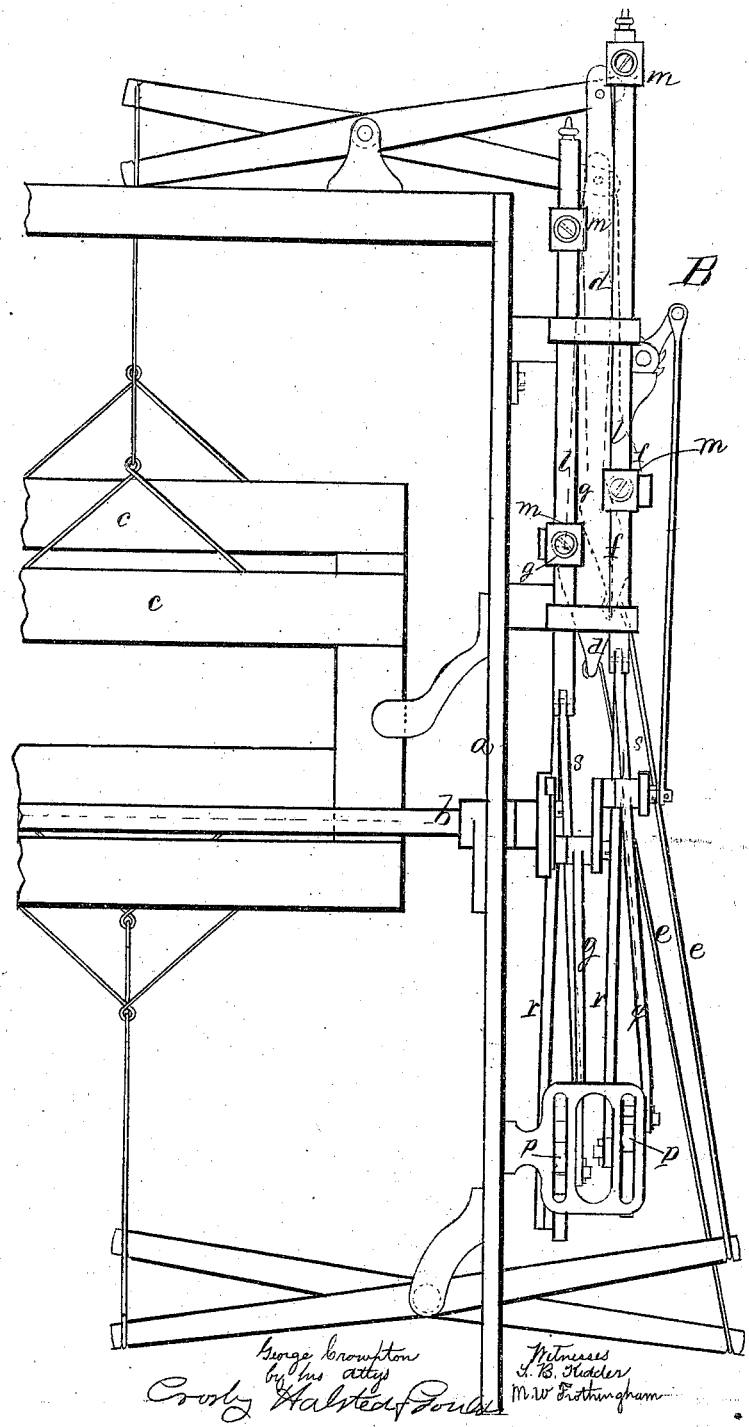

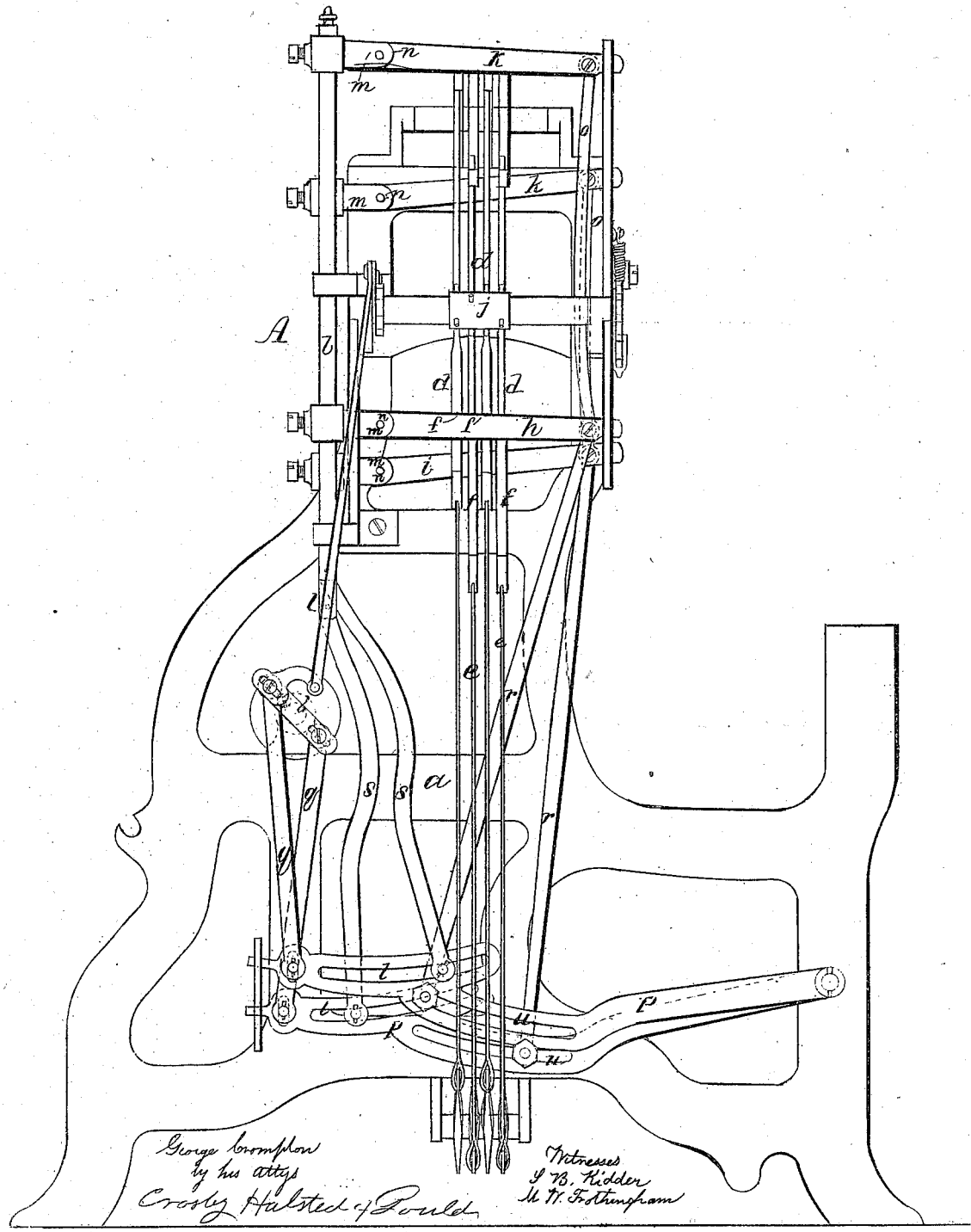

United States Patent Office.

GEORGE CROMPTON, OF WORCESTER, MASSACHUSETTS.

Letters Patent No. 94,873, dated September 14, 1869.

IMPROVEMENT IN LOOMS.

The Schedule referred to in these Letters Patent and making part of the same.

*To all whom it may concern:*

Be it known that I, GEORGE CROMPTON, of Worcester, in the county of Worcester, and State of Massachusetts, have invented Improvements in Looms; and I do hereby declare that the following, taken in connection with the drawings which accompany and form part of this specification, is a description of my invention, sufficient to enable those skilled in the art to practise it.

My present invention relates particularly to the organization of the lifter, depresser, and evener-mechanism of that class of fancy looms in which upright hooked jacks being employed, each series of the hooks (raised or depressed) is brought into angular position at each formation of the shed.

The drawings represent the mechanism of a loom embodying my improvement.

A shows an end elevation of the loom.

B is a side elevation of the harness-mechanism.

*a* denotes the frame.

B, the crank-shaft.

*c*, a set of harness frames, strung between the inner ends of horizontal harness-levers, whose outer ends are connected by a corresponding series of jacks, *d*, and inclined cording, *e*, the stress of which cording bears the levers against a pattern-chain or cylinder, *j*.

Upon the outer edge of each jack is a hook, *f*, and upon the inner edge thereof is a hook, *g*, and while the stress of the cording holds the outer hooks normally in the path of upward movement of a lifter-bar, *h*, the hooks of those jacks pressed inward by the pattern-mechanism are carried into the path of downward movement of a depresser-bar, *i*, the respective jacks being raised or depressed (and the shed thereby formed,) accordingly, as their hooks are in position to be caught by the lifter or depresser, all as readily understood by loom-manufacturers, and other persons skilled in the art of weaving with these looms.

The hooks are evened for redistribution of the jacks (to form a new shed after each throw of the shuttle) by evener-bars *k*, the outer one of which is connected to and moves with the lifter-bar *h*, while the inner one is similarly connected to and moves with the depresser-bar *i*.

The lifter and evener connected thereto, and the depresser and evener connected thereto, are connected to and actuated by slide-rods *l l*, each rod having a pair of arms, *m*, affixed thereto, to which the evener and depresser-bars, or eveners and lifter-bars, are jointed or pivoted, as seen at *n*.

The inner ends of each pair of bars so connected, being pivoted to these arms, their outer ends are connected by a link, *o*, jointed to both, so that the bars can turn upon such joints.

Near the bottom of the frame, in or about in the vertical plane of the breast-beam, two long levers, *p*, are fulcrumed, the opposite end of each of these levers being connected to a crank on the end of the shaft *b*, by a crank-rod, *q*.

To one or the other of these levers each lifter or depresser is connected by a long link *r*, and to each slide-rod by a long link *s*, and as the lever is raised or lowered upon its fulcrum by its crank-rod connection, the lifter or depresser is raised or lowered, and with it the evener to which it is connected, by the slide-rod and the link *o*, and it will readily be seen that a degree of inclination will be produced in each lifter or depresser, (when raised or lowered,) in accordance with the position of the points of connection of the two links, *r* and *s*, to their actuating-levers *p*.

To vary the degree of inclination thus produced, each lever *p* is provided with two long slots, *t u*, by means of which the point of connection of each link may be adjusted.

It is in this mechanism for thus actuating the lifter and depresser and evener-levers, to produce either simple up and down movements of the levers, without bringing them into angular positions, or the angular disposition of the jack-hooks and inclination of the shed, and in the provision for adjusting the connectors for producing the inclination (or movement to the shed without such inclination) in each lifter or depresser, that my present invention consists.

It will be seen that this mechanism for actuating the lifter, depresser, and evener-mechanism, is all compactly disposed opposite the loom-frame, no parts of it projecting, or overhanging, or occupying space where they would form an obstruction.

The slide-rods, lifter, depresser, and evener-bars, or levers, and the actuating-levers, are all guided in their movements by suitable guiding-devices.

I claim—

Lifter, depresser, and evener-bars, connected by the slide-rods and links, and actuated from the crank-shaft, by means of levers *p* and connectors *r s*, combined, arranged, and operating substantially as described.

Also, the combination, with the connectors *r s*, of the levers *p*, provided with the slots *t u*, by which the relative movements of the opposite ends of the bars, jointed to the lever by these connectors, may be adjusted substantially as described.

GEO. CROMPTON.

Witnesses:
FRANCIS GOULD,
S. B. KIDDER.